(12) United States Patent
Yasunaga

(10) Patent No.: US 11,014,412 B2
(45) Date of Patent: May 25, 2021

(54) PNEUMATIC TIRE

(71) Applicant: Toyo Tire & Rubber Co., Ltd., Itami (JP)

(72) Inventor: Toshikazu Yasunaga, Itami (JP)

(73) Assignee: TOYO TIRE CORPORATION, Itami (JP)

(*) Notice: Subject to any disclaimer, the term of this patent is extended or adjusted under 35 U.S.C. 154(b) by 309 days.

(21) Appl. No.: 16/210,275

(22) Filed: Dec. 5, 2018

(65) Prior Publication Data

US 2019/0176536 A1 Jun. 13, 2019

(30) Foreign Application Priority Data

Dec. 13, 2017 (JP) .............................. JP2017-238858

(51) Int. Cl.
*B60C 11/12* (2006.01)
*B60C 11/03* (2006.01)
*B60C 11/13* (2006.01)

(52) U.S. Cl.
CPC ...... *B60C 11/1236* (2013.01); *B60C 11/0302* (2013.01); *B60C 11/032* (2013.01); *B60C 11/0309* (2013.01); *B60C 11/1204* (2013.01); *B60C 11/1263* (2013.01); *B60C 11/1281* (2013.01); *B60C 11/1307* (2013.01); *B60C 2011/0334* (2013.01); *B60C 2011/0346* (2013.01); *B60C 2011/0358* (2013.01); *B60C 2011/0381* (2013.01); *B60C 2011/0383* (2013.01); *B60C 2011/0388* (2013.01); *B60C 2011/1213* (2013.01);

(Continued)

(58) Field of Classification Search
CPC ............. B60C 11/1204; B60C 11/1236; B60C 11/1281; B60C 2011/1213; B60C 2011/1231; B60C 2011/1268; B60C 11/1263

See application file for complete search history.

(56) References Cited

U.S. PATENT DOCUMENTS

2014/0014246 A1 1/2014 Fujita
2016/0114631 A1* 4/2016 Pons ....................... B60C 11/11
152/209.18

FOREIGN PATENT DOCUMENTS

CN 103476602 A 12/2013
CN 106457897 A 2/2017
(Continued)

OTHER PUBLICATIONS

Machine translation for Japan 2012-035664 (Year: 2020).*
(Continued)

*Primary Examiner* — Steven D Maki
(74) *Attorney, Agent, or Firm* — Westerman, Hattori, Daniels & Adrian, LLP

(57) ABSTRACT

A pneumatic tire includes a block (41) formed by being partitioned by a main groove (15) and lateral grooves (20 and 25), and a block traversing sipe (45) which is a sipe longitudinally traversing the block (41), in which the block traversing sipe (45) has a zigzag shape that is constituted by a plurality of longitudinal sipe portions (42) extending in a circumferential direction of the tire, and a lateral sipe portion (43) extending in a tire width direction and connecting end portions of two longitudinal sipe portions (42), and a longitudinal sipe portion (42) closer to a kick-out side of the block (41) has a narrower width.

3 Claims, 3 Drawing Sheets

(52) U.S. Cl.
CPC .............. *B60C 2011/1227* (2013.01); *B60C 2011/1245* (2013.01); *B60C 2011/1254* (2013.01); *B60C 2011/133* (2013.01); *B60C 2200/04* (2013.01); *B60C 2200/14* (2013.01)

(56) References Cited

FOREIGN PATENT DOCUMENTS

| JP | 01-204807 A | * | 8/1989 |
| JP | 2000-318413 A | | 11/2000 |
| JP | 2011-116319 A | | 6/2011 |
| JP | 2012-035664 A | * | 2/2012 |

OTHER PUBLICATIONS

Machine translation for Japan 01-204807 (Year: 2020).*
Office Action dated Jul. 29, 2020, issued in counterpart CN Application No. 201811373773.9, with English translation (8 pages).

* cited by examiner

PNEUMATIC TIRE

CROSS-REFERENCE TO RELATED APPLICATIONS

This application is based on Japanese Patent Application No. 2017-238858 (filed on Dec. 13, 2017) and claims priority from Japanese Patent Application No. 2017-238858. The present disclosure incorporates entire contents of Japanese Patent Application No. 2017-238858.

TECHNICAL FIELD

The present disclosure relates to a pneumatic tire.

BACKGROUND ART

As disclosed in Patent Document 1 or Patent Document 2, it is known that a sipe extending in a circumferential direction of a tire is formed in a land portion of a tread on a pneumatic tire. Such a land portion of the tread is considered to have excellent grounding performance because of an effect of the sipe.
Patent Document 1: JP-A-2011-116319
Patent Document 2: JP-A-2000-318413

DISCLOSURE OF THE INVENTION

Problem that the Invention is to Solve

However, there is a problem that rigidity of the land portion of the tread decreases because of the formation of the sipe.

Therefore, the present disclosure is to provide a pneumatic tire securing grounding performance without decreasing the rigidity of the land portion as much as possible.

Means for Solving the Problem

A pneumatic tire includes a block formed by being partitioned by a main groove and lateral grooves, and a block traversing sipe which is a sipe longitudinally traversing the block, in which the block traversing sipe has a zigzag shape that is constituted by a plurality of longitudinal sipe portions extending in a circumferential direction of the tire, and a lateral sipe portion extending in a tire width direction and connecting end portions of two longitudinal sipe portions, and a longitudinal sipe portion closer to a kick-out side of the block has a narrower width.

Advantage of the Invention

In the pneumatic tire of an embodiment, because of the above mentioned features, the grounding performance is secured without decreasing the rigidity of the land portion as much as possible.

BEST MODE FOR CARRYING OUT THE INVENTION

Figure 1:
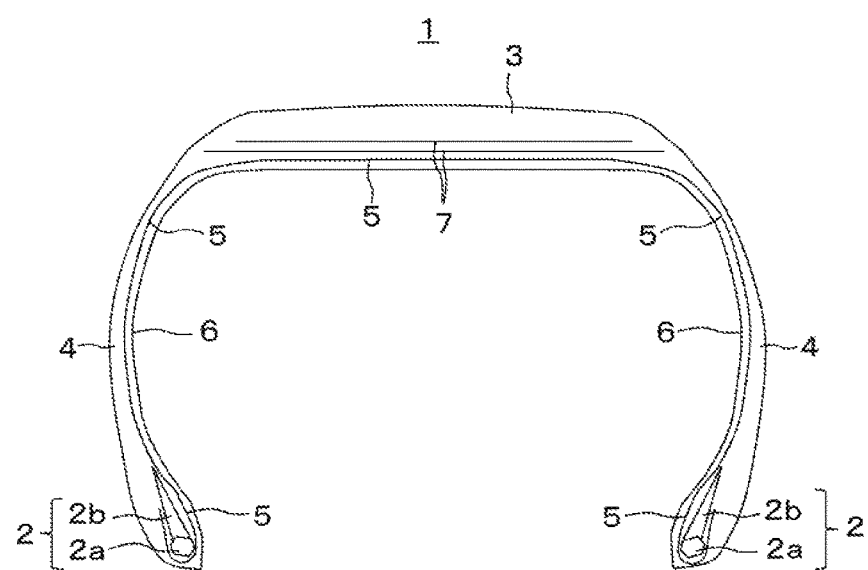
FIG. 1 A cross-sectional view in the width direction of a pneumatic tire of an embodiment.

As illustrated in FIG. 1, a bead portion 2 is provided on both sides in a tire width direction of a pneumatic tire 1. The bead portion 2 is constituted by a bead core 2a made of a steel wire wound in a circular shape and a bead filler 2b made of rubber and provided on a radial outer side of the bead core 2a. A carcass ply 5 is laid across the bead portion 2 on both sides of the tire width direction. The carcass ply 5 is a sheet type member in which a plurality of ply cords arranged in a direction orthogonal to a circumferential direction of the tire are covered with rubber. The carcass ply 5 forms a frame shape of the pneumatic tire 1 between the bead portions 2 on both sides of the tire width direction, and surrounds the bead portions 2 by folding back from inside to outside in the tire width direction around the bead portions 2. A sheet type inner liner 6 made of rubber having low air permeability is adhered to the inside of the carcass ply 5.

One or a plurality of belts 7 are provided on the tire radial outer side of the carcass ply 5. The belt 7 is a member made by covering a plurality of steel-based cords with rubber. A tread rubber 3 having a grounding surface with a road surface (hereinafter, referred to as a "grounding surface") is provided on the tire radial outer side of the belt 7. Further, a side wall rubber 4 is provided on both sides in the tire width direction of the carcass ply 5. In addition to these members, according to functional requirements of the pneumatic tire 1, members, for example, a belt lower pad or a chafer are provided.

Figure 2:
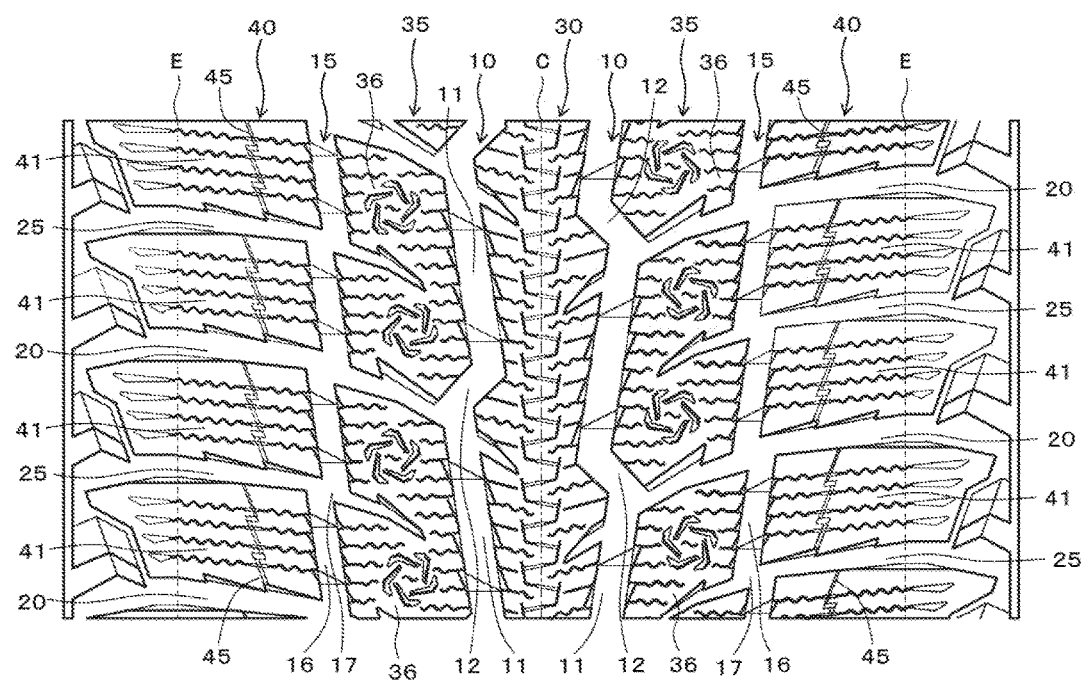
FIG. 2 A tread pattern of the pneumatic tire of the embodiment.

A tread pattern illustrated in FIG. 2 is formed on a surface of the tread rubber 3. In FIG. 2, the vertical direction is the circumferential direction of the tire, and the lateral direction is the tire width direction. In this tread pattern, as a main groove that extends in the circumferential direction of the tire and has a wide width, a total of four main grooves, that is, two center main grooves 10 on a tire equator C side (center side in the tire width direction) and two shoulder main grooves 15 on a tire grounding end E side (outside in the tire width direction) are formed. Then, a center land portion 30 between the two center main grooves 10, a mediate land portion 35 between the center main groove 10 and the shoulder main groove 15, and a shoulder land portion 40 between the shoulder main groove 15 and the tire grounding end E are provided.

Here, the land portion is a portion formed by being partitioned by grooves. Further, the tire grounding end E is an end portion of the grounding surface in the tire width direction in a loaded state. The loaded state is a state where the pneumatic tire is rim-assembled into a normal rim to be a normal inner pressure and loaded by a normal load. Here, the normal rim is a standard rim defined by standards such as JATMA, TRA, and ETRTO. Further, the normal load is a maximum load defined in the above standards. Further, the normal inner pressure is an inner pressure corresponding to the maximum load.

Figure 3:
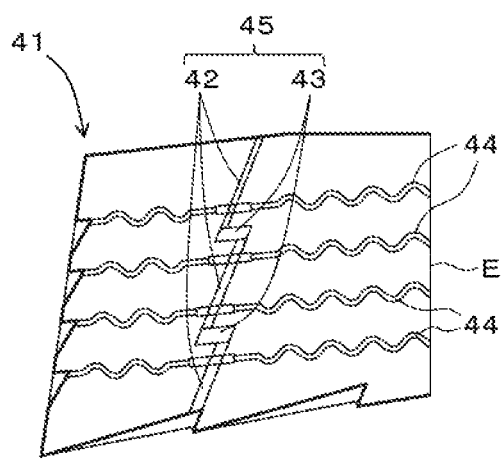
FIG. 3 An enlarged view of a shoulder block.

The center main groove 10 includes long first groove portions 11 that extend obliquely with respect to the circumferential direction of the tire, and short second groove portions 12 that are inclined with respect to the circumferential direction of the tire and extend in a direction different from that of the first groove portion 11. Then, a first groove portion 11 and a second groove portion 12 are arranged alternately, and thus, the center main groove 10 is formed in a zigzag shape. In FIGS. 2 and 3, a lower side is grounded first during rolling of the tire (that is, when the vehicle is traveling). As can be seen from FIG. 2, the first groove portion 11 is inclined such that a portion to be grounded later (in other words, a rear side in the rolling direction) heads toward the tire grounding end E side.

Further, the shoulder main groove 15 includes long first groove portions 16 that extend obliquely with respect to the circumferential direction of the tire, and short second groove portions 17 that are inclined with respect to the circumferential direction of the tire and extend in a direction different from that of the first groove portion 16. Then, the first groove portions 16 and the second groove portions 17 are arranged alternately, and thus, the shoulder main groove 15 has a zigzag shape. As can be seen from FIG. 2, the first groove portion 16 is inclined such that a portion to be grounded later heads toward the tire grounding end E side.

Further, as lateral grooves that extend in the tire width direction, first lateral grooves 20 and second lateral grooves 25 are formed. The first lateral grooves 20 and second lateral grooves 25 are alternately formed in the circumferential direction of the tire. The first lateral groove 20 and the second lateral groove 25 extend obliquely such that the tire grounding end E side is grounded later during rolling of the pneumatic tire.

The first lateral groove 20 traverses the shoulder land portion 40 and the mediate land portion 35, and extends to the center land portion 30 and is closed in the center land portion 30. Further, the second lateral groove 25 traverses the shoulder land portion 40, and extends to the mediate land portion 35 and is closed in the mediate land portion 35. The second groove portion 17 of the shoulder main groove 15 overlaps with the first lateral groove 20 and the second lateral groove 25.

With the configuration of the groove as described above, the center land portion 30 between the two center main grooves 10 is a rib extending in the circumferential direction of the tire without being divided by lateral grooves. Further, the mediate land portion 35 is divided by the first lateral groove 20, and thus, is a row of a plurality of mediate blocks 36 arranged in the circumferential direction of the tire. Further, the shoulder land portion 40 is divided by the first lateral groove 20 and the second lateral groove 25, and thus, is a row of a plurality of shoulder blocks 41 arranged in the circumferential direction of the tire.

As illustrated in FIGS. 2 and 3, a block traversing sipe 45 that is a sipe longitudinally traversing the shoulder block 41 is formed in the shoulder block 41. A sipe is a narrow groove having a narrow width where the opening end to the grounding surface is closed in the loaded state. The block traversing sipe 45 is opened to the lateral grooves 20 and 25 at the both sides of the shoulder block 41 in the circumferential direction of the tire.

As illustrated in FIG. 3, the block traversing sipe 45 is constituted by a plurality of longitudinal sipe portions 42 extending in the circumferential direction of the tire, and a lateral sipe portion 43 extending in the tire width direction and connecting end portions of two longitudinal sipe portions 42.

One block traversing sipe 45 may have two or more longitudinal sipe portions 42 and one or more lateral sipe portions 43. In the present embodiment, it is assumed that one block traversing sipe 45 has three longitudinal sipe portions 42 and two lateral sipe portions 43. In the case where the block traversing sipe 45 is constituted by the plurality of longitudinal sipe portions 42 and the plurality of lateral sipe portions 43 as in the present embodiment, the longitudinal sipe portion 42 and the lateral sipe portion 43 are alternately arranged, whereby the block traversing sipe 45 is formed in a zigzag shape.

The longitudinal sipe portion 42 is inclined with respect to the circumferential direction of the tire such that a kick-out side of the shoulder block 41 (that is, a side that is grounded later during rolling of the tire) heads toward the tire grounding end E side. Then, the block traversing sipe 45 including the lateral sipe portion 43 as a whole is also inclined such that the kick-out side of the shoulder block 41 heads toward the tire grounding end E side.

In one shoulder block 41, a width of each of the longitudinal sipe portions 42 is different from each other, and the longitudinal sipe portion 42 closer to the kick-out side of the shoulder block 41 has a narrower width. In other words, the longitudinal sipe portion 42 closer to a step-in side of the shoulder block 41 (that is, a side that is grounded first during rolling of the tire) has a wider width. A depth of the longitudinal sipe portion 42 is, for example, 75 to 85% (including 75% and 85%) of a depth of the first lateral groove 20 or the second lateral groove 25, but, not limited thereto.

Further, in one shoulder block 41, a width of each of the lateral sipe portions 43 is different from each other, and the lateral sipe portion 43 closer to the kick-out side of the shoulder block 41 has a narrower width. In other words, the lateral sipe portion 43 closer to the step-in side of the shoulder block 41 has a wider width. Any of the lateral sipe portions 43 are shorter and shallower than any of the longitudinal sipe portions 42. A depth of the lateral sipe portion 43 is, for example, 20 to 30% (including 20% and 30%) of the depth of the first lateral groove 20 or the second lateral groove 25, but, not limited thereto.

Sipes other than the block traversing sipe 45 may be formed in the shoulder block 41. For example, in the illustrated embodiment, a plurality of wavy sipes 44 extending in the tire width direction is formed in the shoulder block 41. The wavy sipes 44 intersect the block traversing sipe 45.

As described above, in the present embodiment, since the block traversing sipe 45 is longitudinally traversing the block, the block is excellent in grounding performance. Here, since the shoulder block 41 tends to be worse in grounding performance than other blocks on the tire equator C side, the effect is great when the block traversing sipe 45 is formed in the shoulder block 41 as in the embodiment.

Further, since the block traversing sipe 45 has a zigzag shape constituted by the longitudinal sipe portions 42 and the lateral sipe portions 43, when the shoulder block 41 is deformed during traveling, rubber on both sides sandwiching the block traversing sipe 45 meshes with each other, and then the rigidity of the shoulder block 41 is secured.

Further, the rigidity of the portion of the kick-out side of the block has an effect on braking performance. However, in the present embodiment, since the longitudinal sipe portion 42 closer to the kick-out side of the shoulder block 41 has a narrower width, the longitudinal sipe portion 42 closer to the kick-out side is likely to be closed during braking operation, and the rigidity of the kick-out side of the shoulder block 41 is secured. Therefore, the pneumatic tire 1 has excellent braking performance.

As described above, in the present embodiment, the rigidity and the grounding performance of the shoulder block 41 are secured.

Further, since the block traversing sipe 45 is constituted by the longitudinal sipe portions 42 and the lateral sipe portions 43 and the lateral sipe portions 43 are present, the entire block traversing sipe 45 may be lengthened, and the long longitudinal sipe portions 42 may be inclined more with respect to the circumferential direction of the tire. Therefore, an edge effect occurs not only in the tire width direction, but also in the circumferential direction of the tire. Therefore, the pneumatic tire 1 is excellent in traction performance.

Further, since the lateral sipe portions 43 are shallower than the longitudinal sipe portions 42, the rigidity of the zigzag-shaped block traversing sipe 45 on a corner portion of the inner side of the bent portion is not extremely decreased.

Further, since the lateral sipe portion 43 closer to the kick-out side of the shoulder block 41 has a narrower width, the lateral sipe portion 43 closer to the kick-out side is likely to be closed during braking operation. Therefore, the rigidity of the shoulder block 41 on the kick-out side is secured during the braking operation, so that the pneumatic tire 1 is excellent in braking performance.

Evaluation of pneumatic tires of a comparative example and an example shown in Table 1 was conducted. The pneumatic tire of the example is the pneumatic tire described in the above embodiment and the longitudinal sipe portion closer to the kick-out side has a narrower width. Meanwhile, the pneumatic tire of the comparative example has a same width of longitudinal sipe portions from a step-in side to a kick-out side, and other structures thereof are the same as the pneumatic tire described in the above embodiment. The widths of the longitudinal sipe portions of these pneumatic tires are summarized in Table 1. Both of the pneumatic tires have a tire size of 195/65R15 91T, and other structures other than the width of the longitudinal sipe portions are the same.

Braking operation was carried out while driving a vehicle equipped with these pneumatic tires at a speed of 60 km per hour, and the braking performance was evaluated by an index. For the index, the value of the comparative example is set to 100, and the value increases as the braking performance is better. The evaluation result is as shown in Table 1. It is confirmed that the pneumatic tire of the example has better braking performance than the pneumatic tire of the comparative example.

TABLE 1

|  |  | Comparative example | Example |
|---|---|---|---|
| Width of longitudinal sipe portion | Block kick-out side | 0.77 mm | 0.50 mm |
|  | Block center | 0.77 mm | 0.80 mm |
|  | Block stepped side | 0.77 mm | 1.00 mm |
| Braking performance |  | 100 | 105 |

The above embodiments are examples, and the scope of the present disclosure is not limited thereto. Various modifications may be made to the above embodiments within the scope without escaping from the purpose of the present disclosure.

For example, the block traversing sipe 45 as described above may be formed in blocks other than the shoulder block 41, for example, in the mediate block 36.

DESCRIPTION OF REFERENCE NUMERALS AND SIGNS

C . . . tire equator, E . . . tire grounding end, 1 . . . pneumatic tire, 2 . . . bead portion, 2a . . . bead core, 2b . . . bead filler, 3 . . . tread rubber, 4 . . . side wall rubber, 5 . . . carcass ply, 6 . . . inner liner, 7 . . . belt, 10 . . . center main groove, 11 . . . first groove portion, 12 . . . second groove portion, 15 . . . shoulder main groove, 16 . . . first groove portion, 17 . . . second groove portion, 20 . . . first lateral groove, 25 . . . second lateral groove, 30 . . . center land portion, 35 . . . mediate land portion, 36 . . . mediate block, 40 . . . shoulder land portion, 41 . . . shoulder block, 42 . . . longitudinal sipe portion, 43 . . . lateral sipe portion, 44 . . . wavy sipe, 45 . . . block traversing sipe

The invention claimed is:

1. A pneumatic tire comprising a block formed by being partitioned by a main groove and lateral grooves, and a block traversing sipe which is a sipe longitudinally traversing the block,
   wherein the block traversing sipe has a zigzag shape that is constituted by a plurality of longitudinal sipe portions extending in a circumferential direction of the tire, and a lateral sipe portion extending in a tire width direction and connecting end portions of two longitudinal sipe portions,
   wherein one of the plurality of longitudinal sipe portions closer to a kick-out side of the block has a width that is narrower than a width of another of the plurality of longitudinal sipe portions closer to a step-in side of the block, and
   wherein the lateral sipe portion is shorter and shallower than the longitudinal sipe portions.

2. The pneumatic tire according to claim 1, wherein the block traversing sipe has a plurality of lateral sipe portions, and a lateral sipe portion closer to the kick-out side of the block has a width narrower than another lateral sipe portion closer to the step-in side of the block.

3. The pneumatic tire according to claim 1, wherein each of the plurality of longitudinal sipe portions is inclined with respect to the circumferential direction of the tire.

* * * * *